Patented June 3, 1947

2,421,597

UNITED STATES PATENT OFFICE 2,421,597

UNSATURATED CYCLIC ETHERS

Herman A. Bruson, Philadelphia, Pa., assignor to The Resinous Products & Chemical Company, Philadelphia, Pa., a corporation of Delaware No Drawing. Application April 1, 1944, Serial No. 529,196

13 Claims. (Cl. 260—611)

This invention relates to 3,6-endomethylene-1,2,3,6-tetrahydrobenzyl ethers and to a method for their preparation. Said ethers may be represented by the formula:

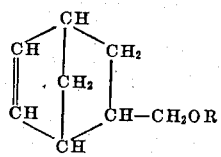

wherein R represents an organic radical.

According to this invention, ethers of this formula are obtained by heating dicyclopentadiene with allyl ethers at a temperature from about 150° C. to 200° C. In place of the dicyclopentadiene, there may be used an equivalent amount of monomeric cyclopentadiene. As is known, dicyclopentadiene reverts to the monomer when heated above 145° C., while the monomer tends to form the polymers when heated or on standing. The dimer has the great advantage that the reaction with an allyl ether may be performed under atmospheric pressure if the allyl ether used boils above about 145° C.

The heating may be advantageously carried out at atmospheric pressure in a vessel equipped with a reflux condenser, but may also be carried out in a closed vessel and under pressure, particularly if the allyl ether boils below 145° C. The reaction which occurs is as follows:

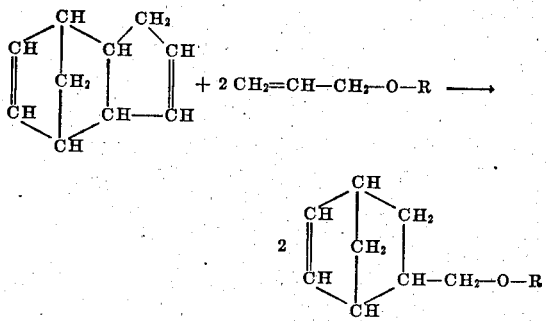

The radical R may be saturated or unsaturated and may be aliphatic, aromatic, mixed aromatic-aliphatic, hydroaromatic, heterocyclic, or cycloaliphatic in character. It may possess substituents, such as, for example, halogen, hydroxyl, alkoxy, or other similar groups. R may thus represent any organic radical which helps to form the allyl ether, CH₂=CHCH₂OR, and may be exemplified by alkyl groups such as methyl, ethyl, propyl, isopropyl, butyl, capryl, octyl, decyl, octadecyl, and the like; by alkenyl groups, such as allyl, methallyl, crotyl, undecenyl, oleyl, or the like; by substituted aliphatic substituents such as ethoxyethyl, hydroxyethyl, chloroethyl, dimethylaminoethyl, butoxyethoxyethyl, and the like; by arylaliphatic substituents, such as benzyl, methylbenzyl, butylbenzyl, chlorobenzyl, methoxybenzyl, phenylbenzyl, phenylethyl, phenoxyethyl, phenoxypropyl, phenoxyethoxyethyl, benzyloxyethyl, and similar radicals; by aryl groups, such as phenyl, chlorophenyl, methylphenyl, butylphenyl, octylphenyl, cyclohexylphenyl, naphthyl, etc., and other cyclic radicals such as cyclohexyl, methylcyclohexyl, cyclopentyl, endomethylene benzyl, dihydronordicyclopentendienyl, terpenyl, tetrahydrofurfuryl, and other cyclic groups. The ethers in which R is a hydrocarbon radical are of particular importance. Of these, those in which R contains at least one olefinic linkage, whether in a straight chain or in a cycle, are of particular utility in coating compositions.

The products are of value as intermediates for the preparation of drugs, insecticides, and plastics.

The following examples illustrate this invention:

Example 1

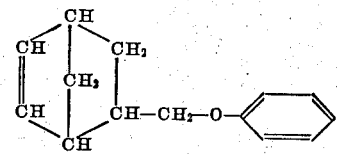

A mixture of 152 grams of allyl phenyl ether and 84 grams of technical dicyclopentadiene (95% pure) was stirred and heated in an oil bath in a flask attached to a reflux condenser. The temperature in the flask was held at 170°–175° C. for eight hours. The reaction product was then distilled in vacuo. After unchanged starting material had come over, the 3,6-endomethylene-1,2,3,6-tetrahydrobenzyl phenyl ether distilled as an almost colorless oil at 110°–130° C./1 mm. in a yield of 140 grams. The pure compound boils at 134° C./6 mm.

Example 2

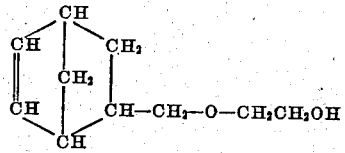

A mixture of 372 grams of β-allyloxyethanol and 250 grams of dicyclopentadiene was heated under a reflux condenser at 145°–165° C. for twenty-one hours, and the reaction mixture was distilled in vacuo.

The desired 3,6-endomethylene-1,2,3,6-tetrahydrobenzyloxyethanol distilled over as a colorless oil at 105°–110° C./3 mm. in a yield of 312 grams. Upon redistillation, the pure compound boiled at 110°–112° C./7 mm. and possessed the following constants: $N_D^{25}$ 1.4920; $d_4^{25}$ 1.036.

*Example 3*

A mixture consisting of one mol equivalent of dicyclopentadiene and two mol equivalents of diallyl ether was heated in a closed vessel at 170°–180° C. for five hours and the product distilled in vacuo. Two main liquid fractions were obtained in addition to unchanged starting material, namely:

I. Boiling range, 65°–110° C./5 mm.
II. Boiling range, 110°–130° C./5 mm.

Fraction I, upon refractionation, yielded a cut boiling at 80°–90° C./14 mm. consisting essentially of 3,6-endomethylene-1,2,3,6-tetrahydrobenzyl allyl ether,

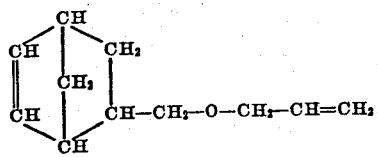

Fraction II, upon refractionation, yielded a cut boiling at 125°–135° C./6 mm. consisting of the di-addition compound:

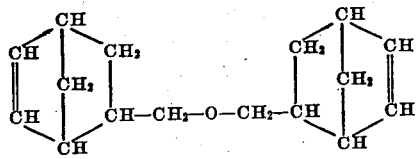

*Example 4*

A mixture of 194 grams of allyl-o-chlorophenyl ether and 80 grams of dicyclopentadiene was heated for fourteen hours at 160°–170° C. and the reaction product distilled in vacuo.

The desired 3,6-endomethylene-1,2,3,6-tetrahydrobenzyl-o-chlorophenyl ether,

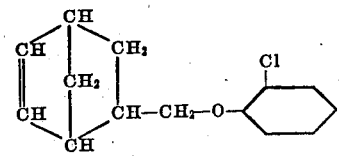

distilled over at 130°–140° C./1–2 mm. as a thick oil in a yield of 157 grams. Upon redistillation, the pure compound boiled at 130°–134° C./1 mm.

*Example 5*

A mixture of 139 grams of dicyclopentadiene and 190 grams of allyloxydihydronordicyclopentadiene,

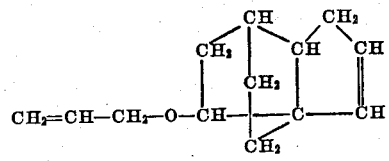

was heated for thirteen hours at 165°–175° C. under a reflux condenser, and the product was distilled in vacuo.

The 3,6 - endomethylene - 1,2,3,6 - tetrahydrobenzyl ether of hydroxydihydronordicyclopentadiene,

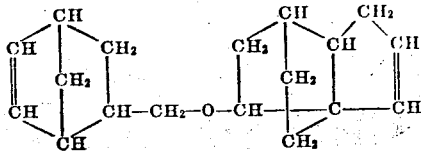

distilled over at 150°–160° C./1–2 mm. as a colorless oil in a yield of 208 grams.

The allyloxydihydronordicyclopentadiene used above is a colorless oil boiling at 117°–119° C./12 mm., obtained by condensing allyl alcohol with dicyclopentadiene in the presence of an acidic catalyst, such as sulfuric acid, as described in copending application Serial No. 476,640, filed February 20, 1943.

*Example 6*

A mixture of 104 grams of dicyclopentadiene and 183 grams of the allyl ether of p-$\alpha,\alpha,\gamma,\gamma$-tetramethyl butylphenol was heated under a reflux condenser for eight hours at 160°–175° C. The product, upon distillation in vacuo, yielded 154 grams of 3,6-endomethylene-1,2,3,6-tetrahydrobenzyl ether of p-$\alpha,\alpha,\gamma,\gamma$-tetramethyl butyl phenol,

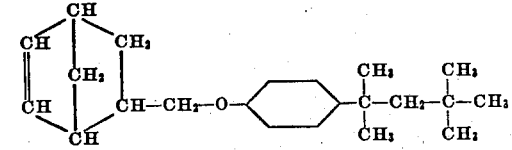

as a pale yellow oil boiling at 167°–172° C./1 mm.

*Example 7*

A mixture of 78 grams of 2,4,5-trichlorophenyl allyl ether and 46 grams of dicyclopentadiene was heated at 160°–165° C. for eight hours under a reflux condenser, and the product was distilled in vacuo.

The desired 3,6-endomethylene-1,2,3,6-tetrahydrobenzyl ether of 2,4,6-trichlorophenol,

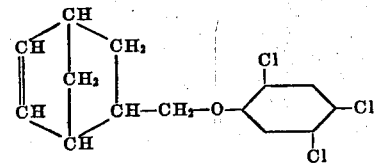

distilled over at 155°–160° C./1 mm. as a viscous oil.

*Example 8*

A mixture of 120 grams of dicyclopentadiene and 181 grams of the allyl ether of p-phenylphenol was stirred and heated under a reflux condenser for six hours at 160°–165° C. The product was then distilled in vacuo.

The 3,6-endomethylene-1,2,3,6-tetrahydrobenzyl xenyl ether,

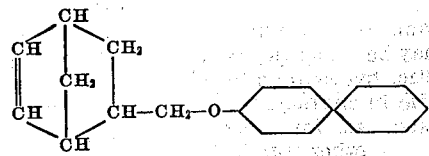

boiled at 200°–205° C./1 mm. in a yield of 100 grams. It is a colorless crystalline compound, melting at 97° C. after recrystallization from ethanol.

Example 9

A mixture of 96 grams of dicyclopentadiene and 100 grams of benzyl allyl ether was heated for eight hours at 160°–168° C. under reflux. Upon distillation of the reaction product in vacuo, there was obtained 82 grams of 3,6-endomethylene-1,2,3,6-tetrahydrobenzylbenzyl ether,

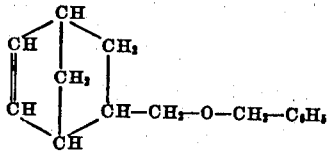

as a colorless liquid boiling at 114°–118° C./0.5 mm.

Example 10

A mixture of 66 grams of dicyclopentadiene and 128 grams of 2-octyl allyl ether was heated for eight hours at 160°–170° C. Upon distillation in vacuo, the product having the formula:

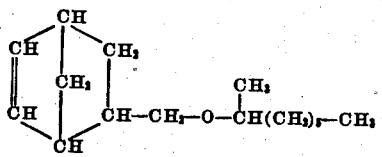

was obtained as a faintly yellow oil boiling at 109°–114° C./1–2 mm.

Example 11

The product obtained by heating a mixture of 85 grams of dicyclopentadiene and 133 grams of p-cyclohexylphenyl allyl ether at 165°–170° C. for eight hours was distilled in vacuo. At 190°–195° C./1 mm., a colorless liquid distilled over which rapidly solidified to a crystalline mass. The yield was 85 grams. Upon recrystallization from ethanol, the compound having the formula:

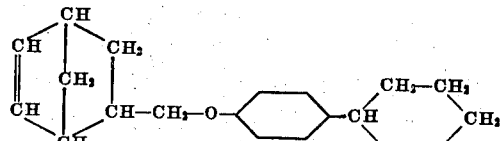

formed colorless crystals melting at 68°–69° C.

Example 12

A mixture of 222 grams of β-allyloxypropionitrile and 139 grams of dicyclopentadiene was heated under reflux for six hours at 160°–180° C., and the product was distilled in vacuo.

The fraction boiling at 120°–138° C./6–7 mm. was a colorless oil having the formula:

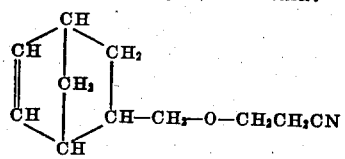

The yield was 188 grams. Upon redistillation, the pure compound boiled at 104°–108° C./1–2 mm.

Example 13

A mixture of 55.6 grams of dicyclopentadiene and 70 grams of allyloxycyclobutane sulfone,

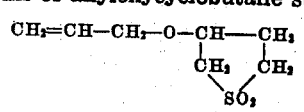

was heated under reflux for eight hours at 160°–168° C. with constant stirring and the product worked up by distillation in vacuo.

The product having the formula:

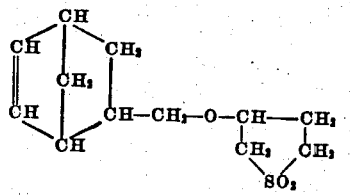

distilled at 170°–190° C./1 mm. Upon redistillation, the pure compound boiled at 188°–194° C./1 mm. It was a viscous pale yellow oil.

I claim:

1. As new compounds, ethers having the formula:

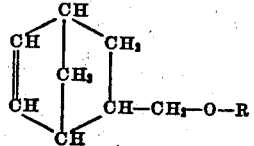

wherein R is a hydrocarbon group.

2. As new compounds, ethers having the formula:

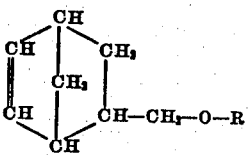

wherein R is a hydrocarbon radical containing an olefinic linkage.

3. Ethers having the formula:

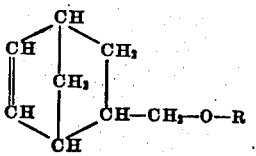

wherein R is an aromatic hydrocarbon radical.

4. Ethers having the formula

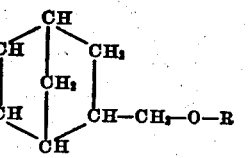

wherein R is a hydrocarbon group containing a benzene ring and six to fourteen carbon atoms.

5. Ethers having the formula:

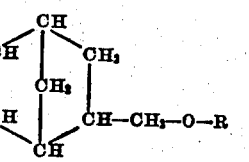

wherein R is an aliphatic hydrocarbon radical containing one to eighteen carbon atoms.

6. Ethers having the formula:

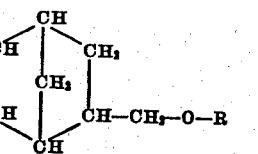

wherein R in an aliphatic hydrocarbon radical containing an olefinic linkage.

7. Ethers having the formula

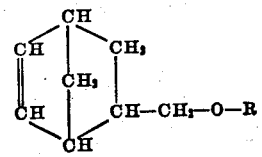

wherein R is an alkenyl group of three to eighteen carbon atoms.

8. The ether having the formula

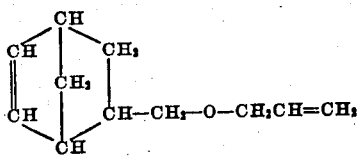

9. The ether having the formula:

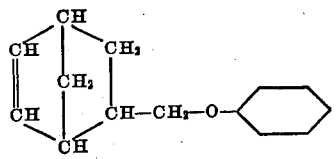

10. The ether having the formula:

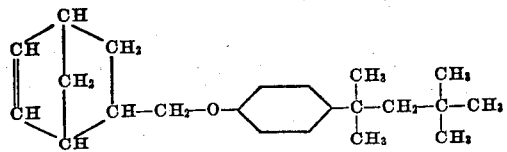

11. A method for preparing ethers having the formula:

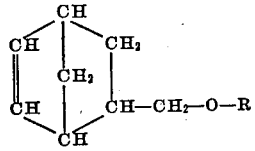

wherein R is a hydrocarbon radical, which comprises heating dicyclopentadiene with an allyl ether, $CH_2=CH-CH_2-O-R$, at a temperature between about 150° and 200° C.

12. A method for preparing an ether having the formula:

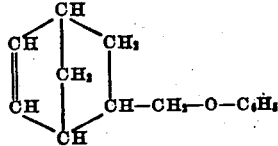

which comprises heating dicyclopentadiene with phenyl allyl ether at a temperature between about 150° and 200° C.

13. A method for preparing an ether having the formula:

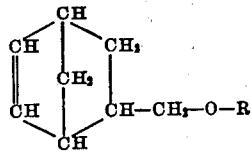

wherein R is a hydrocarbon radical containing an olefinic linkage, which comprises heating dicyclopentadiene with an allyl ether, $CH_2=CH-CH_2-O-R$ wherein R has the same significance, at a temperature between about 150° and 200° C.

HERMAN A. BRUSON.

REFERENCES CITED

The following references are of record in the file of this patent:
Alder & Wendemuth, Berichte 71B, 1939–57 (1938).
(Copy of Berichte in Pat. Off. Lib.)